(12) United States Patent
Maesono

(10) Patent No.: US 11,984,623 B2
(45) Date of Patent: May 14, 2024

(54) BATTERY, METHOD OF MANUFACTURING BATTERY, AND MOLDING DIE

(71) Applicant: Prime Planet Energy & Solutions, Inc., Tokyo (JP)

(72) Inventor: Hiroshi Maesono, Katou (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 88 days.

(21) Appl. No.: 17/533,120

(22) Filed: Nov. 23, 2021

(65) Prior Publication Data

US 2022/0173486 A1     Jun. 2, 2022

(30) Foreign Application Priority Data

Nov. 30, 2020    (JP) ................... 2020-198013

(51) Int. Cl.
   *H01M 50/566*     (2021.01)
   *H01M 4/02*        (2006.01)
   *H01M 4/70*        (2006.01)

(52) U.S. Cl.
CPC .......... *H01M 50/566* (2021.01); *H01M 4/70* (2013.01); *H01M 2004/021* (2013.01)

(58) Field of Classification Search
CPC ............... H01M 50/566; H01M 4/70; H01M 2004/021; H01M 50/55; H01M 50/553; H01M 50/552; H01M 50/528; H01M 50/531; H01M 50/543; Y02P 70/50; Y02E 60/10

See application file for complete search history.

(56) References Cited

U.S. PATENT DOCUMENTS

| | | | |
|---|---|---|---|
| 2011/0052977 A1 | 3/2011 | Kurata et al. |
| 2011/0281155 A1 | 11/2011 | Ito et al. |
| 2013/0323574 A1 | 12/2013 | Tsunaki et al. |
| 2016/0372722 A1 | 12/2016 | Yoshida et al. |

FOREIGN PATENT DOCUMENTS

| | | |
|---|---|---|
| CN | 102255058 A | 11/2011 |
| CN | 103427063 A | 12/2013 |
| CN | 106257711 A | 12/2016 |
| JP | H02-011232 A | 1/1990 |
| JP | 2010-073336 A | 4/2010 |
| JP | 201148976 A | 3/2011 |
| JP | 20124105 A | 1/2012 |
| JP | 2013246966 A | 12/2013 |
| JP | 201710743 A | 1/2017 |

*Primary Examiner* — Helen Oi K Conley
(74) *Attorney, Agent, or Firm* — HAUPTMAN HAM, LLP

(57) ABSTRACT

Joining by swaging includes: preparing a molding die including a first tapered portion and a second tapered portion, the first tapered portion being inclined at a first angle, the second tapered portion being inclined at a second angle, the second angle being larger than the first angle; and increasing a diameter of a tip portion of a terminal member by causing the first tapered portion of the molding die to face the tip portion of the terminal member, moving the molding die along the central axis, inserting the molding die into a tubular portion formed at the tip portion of the terminal member, pressing a first portion of the tubular portion outward in a radial direction by the first tapered portion, and pressing the second portion of the tubular portion outward in the radial direction by the second tapered portion.

6 Claims, 16 Drawing Sheets

BATTERY, METHOD OF MANUFACTURING BATTERY, AND MOLDING DIE

This nonprovisional application is based on Japanese Patent Application No. 2020-198013 filed on Nov. 30, 2020, with the Japan Patent Office, the entire contents of which are hereby incorporated by reference.

BACKGROUND OF THE INVENTION

Field of the Invention

The present technology relates to a battery, a method of manufacturing the battery, and a molding die.

Description of the Background Art

Conventionally, there has been known a battery having a structure in which an electrode terminal and a current collector are joined by swaging. Such a battery is shown, for example, in Japanese Patent Laying-Open No. 2017-10743.

Depending on the shape of a molding die used for the joining by swaging, the shape of a swaging-joined portion may be unstable. When the shape of the swaging-joined portion is unstable, strain of a member joined by swaging may become locally large to exceed a permissible limit value. It cannot be said that a conventional processing method is necessarily sufficient in order to solve the above problem.

SUMMARY OF THE INVENTION

An object of the present technology is to provide: a battery having a swaging-joined portion having a stable shape; a method of manufacturing the battery; and a molding die used in the manufacturing method.

A battery according to the present technology includes: a conductive member provided with a through hole; and a terminal member inserted in the through hole and having a tip portion exposed on the conductive member. A swaging-joined portion of the tip portion of the terminal member to the conductive member is formed. The tip portion of the terminal member is provided with a recess having an inner circumferential surface. A folded portion is formed on the inner circumferential surface, the folded portion being a portion at which inclination of the inner circumferential surface is changed with respect to a central axis of the terminal member.

A method of manufacturing a battery according to the present technology includes: inserting a terminal member into a through hole of a conductive member; and joining a tip portion of the terminal member to the conductive member by swaging. The joining by swaging includes: preparing a molding die including a first tapered portion and a second tapered portion, the first tapered portion being inclined at a first angle with respect to a central axis of the terminal member, the second tapered portion being provided on a large-diameter side of the first tapered portion, the second tapered portion being inclined at a second angle with respect to the central axis, the second angle being larger than the first angle; and increasing a diameter of the tip portion of the terminal member by causing the first tapered portion of the molding die to face the tip portion of the terminal member, moving the molding die along the central axis, inserting the molding die into a tubular portion formed at the tip portion of the terminal member, pressing a first portion of the tubular portion outward in a radial direction by the first tapered portion, and pressing a second portion of the tubular portion outward in the radial direction by the second tapered portion.

A molding die according to the present technology is a molding die used to join a first member and a second member by swaging, the first member being provided with a through hole, the second member being inserted in the through hole and having a tip portion exposed on the first member, the molding die being insertable into a tubular portion formed at the tip portion of the second member. The molding die includes: a first tapered portion inclined at a first angle with respect to a central axis of the second member; and a second tapered portion provided on a large-diameter side of the first tapered portion and inclined at a second angle with respect to the central axis, the second angle being larger than the first angle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
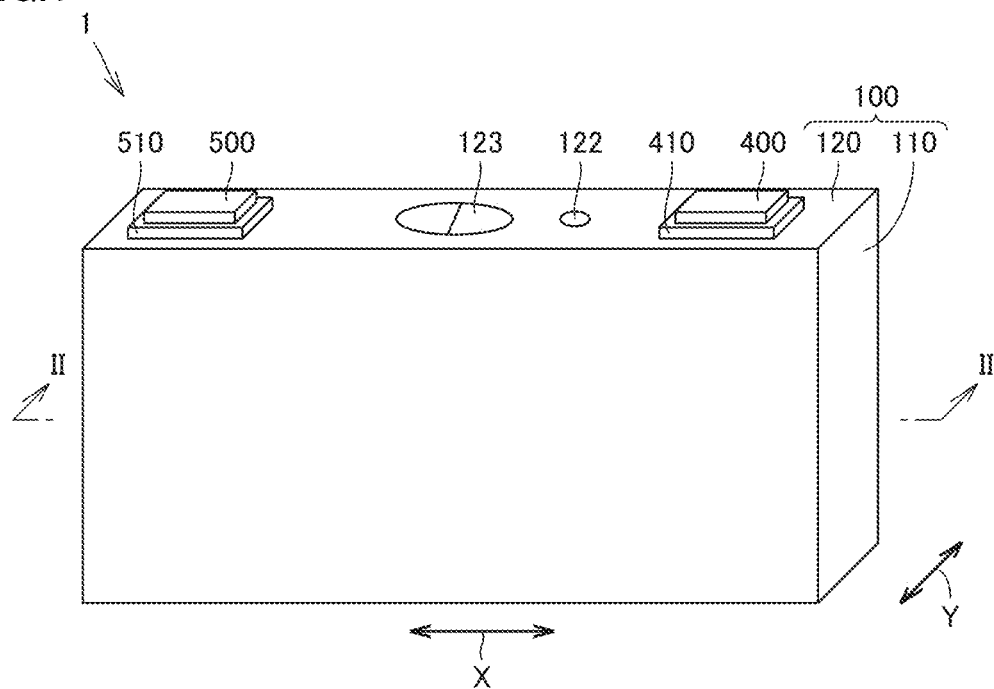
FIG. 1 is a perspective view of a prismatic secondary battery.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain structure is included, a structure other than the foregoing structure may or may not be included. Further, the present technology is not necessarily limited to one that exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

Figure 2:
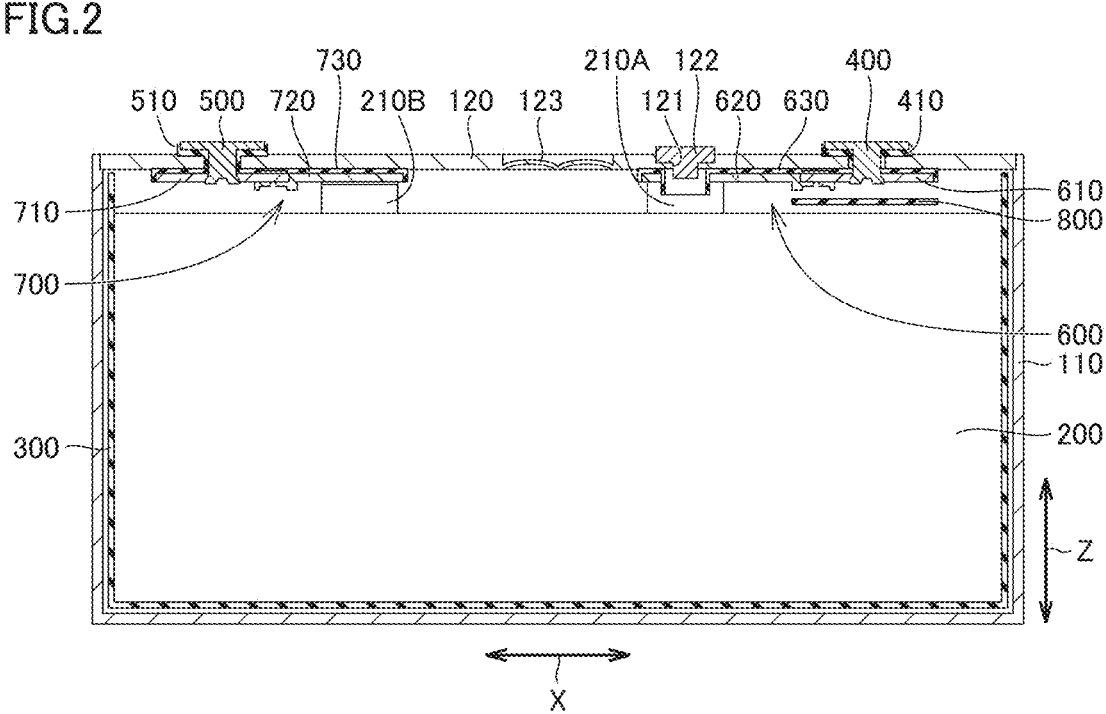
FIG. 2 is a cross sectional view taken along II-II in FIG. 1.

FIG. 1 is a perspective view of a prismatic secondary battery 1. FIG. 2 is a cross sectional view taken along II-II in FIG. 1.

As shown in FIGS. 1 and 2, prismatic secondary battery 1 includes a battery case 100, an electrode assembly 200, an insulating sheet 300, a positive electrode terminal 400, a negative electrode terminal 500, a positive electrode current collecting member 600, a negative electrode current collecting member 700, and a cover member 800.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Sealing plate 120 is provided with an electrolyte solution injection hole 121. After injecting an electrolyte solution into battery case 100 via electrolyte solution injection hole 121, electrolyte solution injection hole 121 is sealed by a sealing member 122. As sealing member 122, for example, a blind rivet or another metal member can be used.

Sealing plate 120 is provided with a gas discharge valve 123. Gas discharge valve 123 is fractured when pressure in battery case 100 becomes more than or equal to a predetermined value. Thus, gas in battery case 100 is discharged to outside of battery case 100.

Electrode assembly 200 is accommodated in battery case 100 together with the electrolyte solution. Electrode assembly 200 is formed by stacking positive electrode plates and negative electrode plates with separators being interposed therebetween. Insulating sheet 300, which is composed of a resin, is disposed between electrode assembly 200 and prismatic exterior body 110.

A positive electrode tab 210A and a negative electrode tab 210B are provided at an end portion of electrode assembly 200 on the sealing plate 120 side.

Positive electrode tab 210A and positive electrode terminal 400 are electrically connected to each other via positive electrode current collecting member 600. Positive electrode current collecting member 600 includes a first positive electrode current collector 610 and a second positive electrode current collector 620. It should be noted that positive electrode current collecting member 600 may be constituted of one component. Positive electrode current collecting member 600 is preferably composed of a metal, and is more preferably composed of aluminum or an aluminum alloy.

Negative electrode tab 210B and negative electrode terminal 500 are electrically connected to each other via negative electrode current collecting member 700. Negative electrode current collecting member 700 includes a first negative electrode current collector 710 and a second negative electrode current collector 720. It should be noted that negative electrode current collecting member 700 may be constituted of one component. Negative electrode current collecting member 700 is preferably composed of a metal, and is more preferably composed of copper or a copper alloy.

Positive electrode terminal 400 is fixed to sealing plate 120 with an outer side insulating member 410 being interposed therebetween, outer side insulating member 410 being composed of a resin. Negative electrode terminal 500 is fixed to sealing plate 120 with an outer side insulating member 510 being interposed therebetween, outer side insulating member 510 being composed of a resin.

Positive electrode terminal 400 is preferably composed of a metal, and is more preferably composed of aluminum or an aluminum alloy. Negative electrode terminal 500 is preferably composed of a metal, and is more preferably composed of copper or a copper alloy. Negative electrode terminal 500 may have: a region that is composed of copper or a copper alloy and that is disposed on the inner side of battery case 100; and a region that is composed of aluminum or an aluminum alloy and that is disposed on the outer side of battery case 100.

Cover member 800 is located between first positive electrode current collector 610 and electrode assembly 200. Cover member 800 may be provided on the negative electrode current collector side. Further, cover member 800 is not an essential member, and may be omitted as appropriate.

Figure 3:
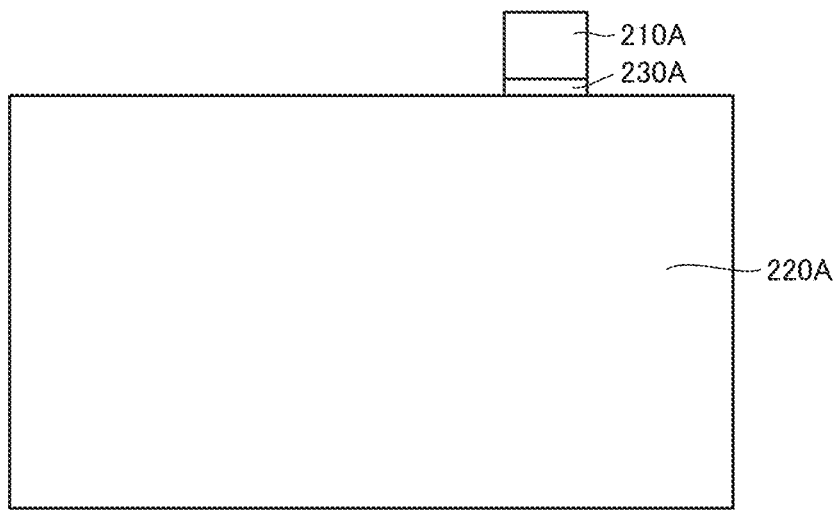
FIG. 3 is a plan view of a positive electrode plate included in an electrode assembly.

FIG. 3 is a plan view of positive electrode plate 200A included in electrode assembly 200. Positive electrode plate 200A has a main body 220A in which a positive electrode active material composite layer is formed on each of both surfaces of a positive electrode core body constituted of an aluminum foil having a quadrangular shape, the positive electrode active material composite layer including a positive electrode active material (for example, lithium nickel cobalt manganese composite oxide or the like), a binder (polyvinylidene difluoride (PVdF) or the like), and a conductive material (for example, a carbon material or the like). The positive electrode core body protrudes from an end side of the main body portion, and the positive electrode core body thus protruding constitutes positive electrode tab 210A. A positive electrode protection layer 230A including alumina particles, a binder, and a conductive material is provided on positive electrode tab 210A at a portion adjacent to main body 220A. Positive electrode protection layer 230A has an electric resistance larger than that of the positive electrode active material composite layer. The positive electrode active material composite layer may include no conductive material. Positive electrode protection layer 230A may not be necessarily provided.

Figure 4:
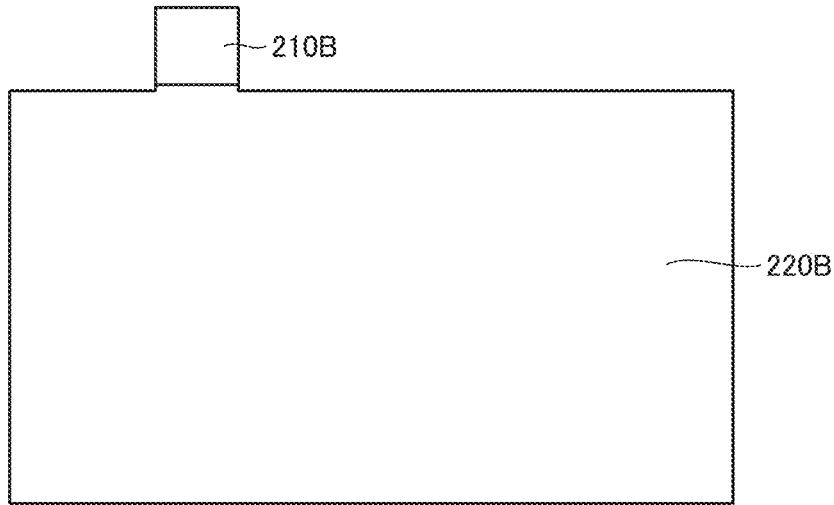
FIG. 4 is a plan view of a negative electrode plate included in the electrode assembly.

FIG. 4 is a plan view of negative electrode plate 200B included in electrode assembly 200. Negative electrode plate 200B has a main body 220B in which a negative electrode active material layer is formed on each of both surfaces of a negative electrode core body constituted of a copper foil having a quadrangular shape. The negative electrode core body protrudes from an end side of main body 220B, and the negative electrode core body thus protruding constitutes negative electrode tab 210B.

Figure 5:
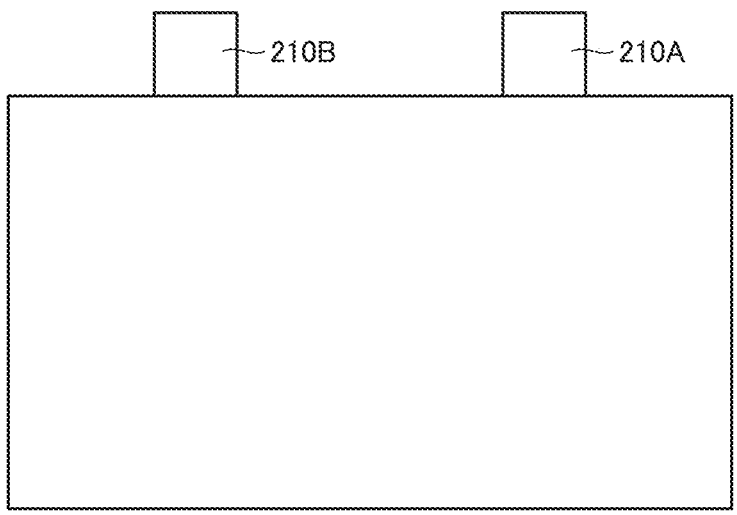
FIG. 5 is a plan view showing the electrode assembly including the positive electrode plate and the negative electrode plate.

FIG. 5 is a plan view showing electrode assembly 200 including positive electrode plates 200A and negative electrode plates 200B. As shown in FIG. 5, electrode assembly 200 is produced such that positive electrode tabs 210A of positive electrode plates 200A are stacked and negative electrode tabs 210B of negative electrode plates 200B are stacked at one end portion of electrode assembly 200. For example, about 50 positive electrode plates 200A and about 50 negative electrode plates 200B are stacked. Positive electrode plates 200A and negative electrode plates 200B are alternately stacked with separators being interposed therebetween, each of the separators being composed of polyolefin, each of the separators having a quadrangular shape. It should be noted that a long separator may be used with the separator being folded in a meandering manner.

Figure 6:
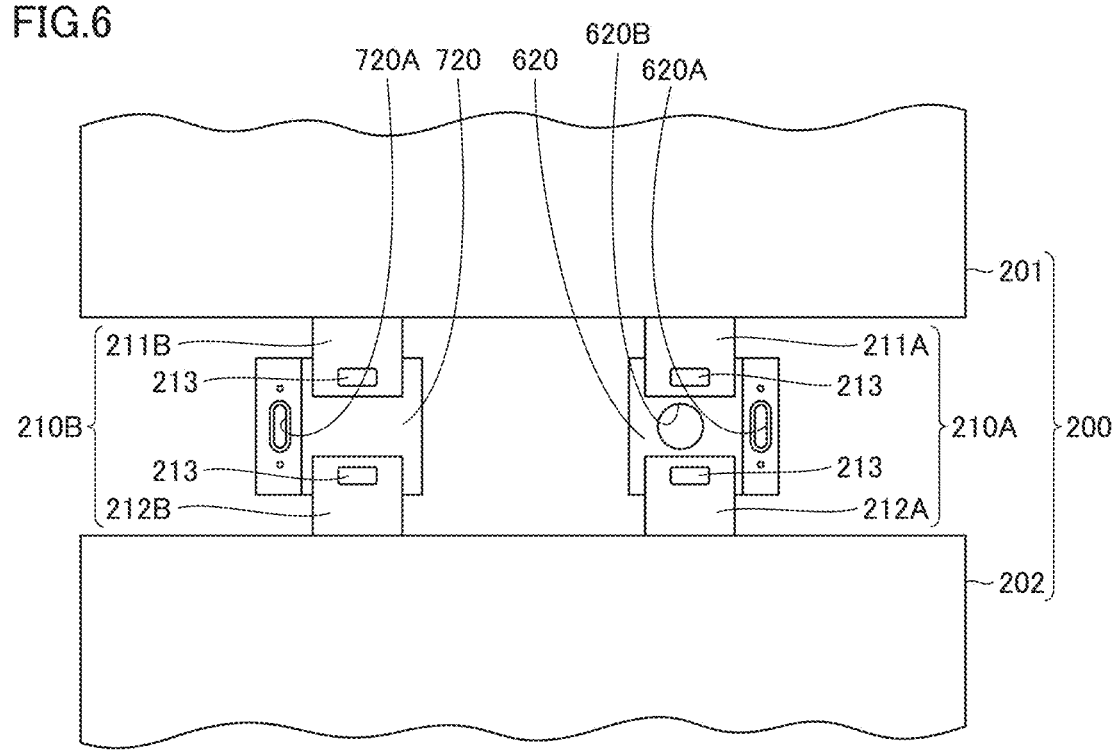
FIG. 6 is a diagram showing a structure of connection between the electrode assembly and each of a positive electrode current collecting member and a negative electrode current collecting member.

FIG. 6 is a diagram showing a structure of connection between electrode assembly 200 and each of positive electrode current collecting member 600 and negative electrode current collecting member 700. As shown in FIG. 6, electrode assembly 200 includes a first electrode assembly element 201 (first stack group) and a second electrode assembly element 202 (second stack group). Separators are also disposed on the respective outer surfaces of first electrode assembly element 201 and second electrode assembly element 202. First electrode assembly element 201 and second electrode assembly element 202 can be fixed in a stacked state by a tape or the like, for example. Alternatively, an adhesive layer may be provided on each of positive electrode plates 200A, negative electrode plates 200B, and the separators to adhere the separators and positive electrode plates 200A and to adhere the separators and negative electrode plates 200B.

The plurality of positive electrode tabs 210A of first electrode assembly element 201 constitute a first positive electrode tab group 211A. The plurality of negative electrode tabs 210B of first electrode assembly element 201 constitute a first negative electrode tab group 211B. The plurality of positive electrode tabs 210A of second electrode assembly element 202 constitute a second positive electrode tab group 212A The plurality of negative electrode tabs 210B of second electrode assembly element 202 constitute a second negative electrode tab group 212B.

Second positive electrode current collector 620 and second negative electrode current collector 720 are disposed between first electrode assembly element 201 and second electrode assembly element 202. Second positive electrode current collector 620 is provided with a first opening 620A and a second opening 620B. First positive electrode tab group 211A and second positive electrode tab group 212A are connected onto second positive electrode current collector 620 by welding, thereby forming welded connection portions 213. First negative electrode tab group 211B and second negative electrode tab group 212B are connected onto second negative electrode current collector 720 by welding, thereby forming welded connection portions 213. Welded connection portions 213 can be formed by, for example, ultrasonic welding, resistance welding, laser welding, or the like.

Figure 7:
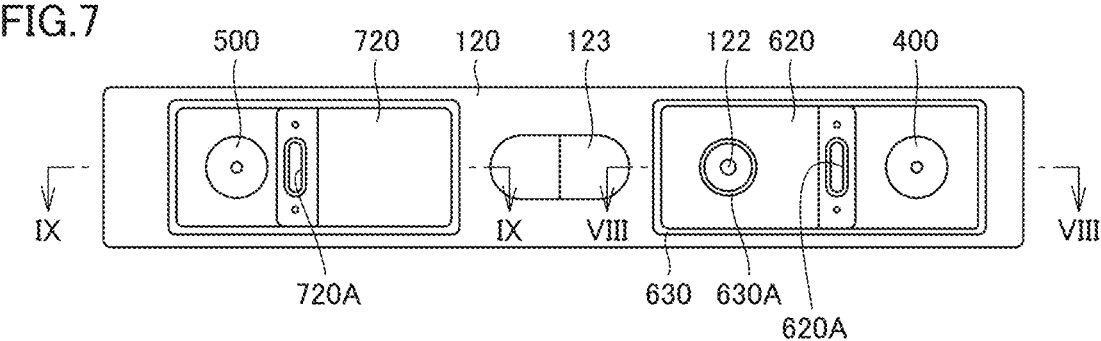
FIG. 7 is a diagram showing a structure of attaching of the positive electrode current collecting member and the negative electrode current collecting member on a sealing plate.
Figure 8:
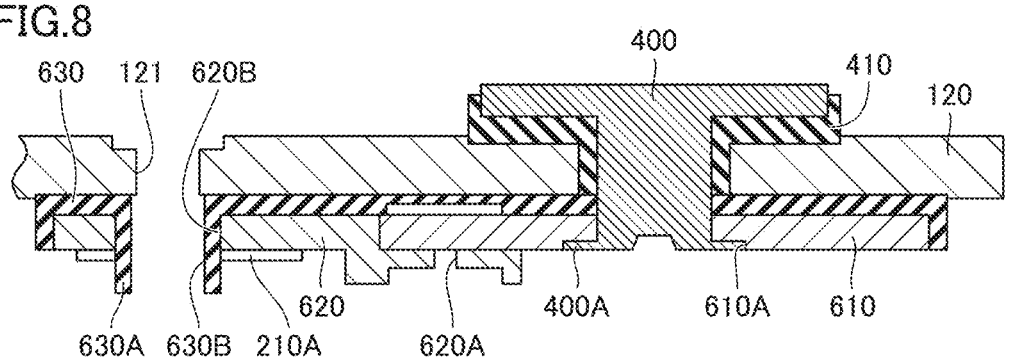
FIG. 8 is a cross sectional view taken along VIII-VIII in FIG. 7.
Figure 9:
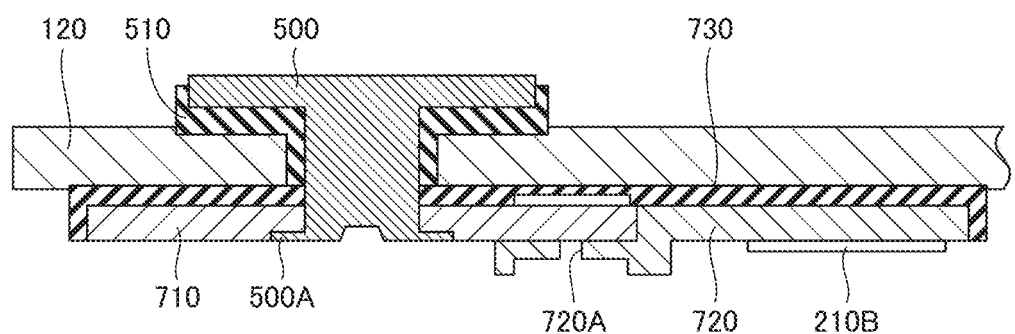
FIG. 9 is a cross sectional view taken along IX-IX in FIG. 7.

FIG. 7 is a diagram showing a structure of attaching of positive electrode current collecting member 600 and negative electrode current collecting member 700 on sealing plate 120. FIG. 8 shows a cross section taken along VIII-VIII in FIG. 7. FIG. 9 shows a cross section taken along IX-IX in FIG. 7.

First, the following describes attaching of positive electrode current collecting member 600 on sealing plate 120 with reference to FIGS. 7 and 8.

Outer side insulating member 410 composed of a resin is disposed on the outer surface side of sealing plate 120. First positive electrode current collector 610 and insulating member 630 (positive electrode current collector holder) composed of a resin are disposed on the inner surface side of sealing plate 120. Next, positive electrode terminal 400 is inserted into a through hole of outer side insulating member 410, a positive electrode terminal attachment hole of sealing plate 120, a through hole of first positive electrode current collector 610, and a through hole of insulating member 630. A swaged portion 400A located at the tip of positive electrode terminal 400 is connected onto first positive electrode current collector 610 by swaging. Thus, positive electrode terminal 400, outer side insulating member 410, sealing plate 120, first positive electrode current collector 610, and insulating member 630 are fixed. It should be noted that the portions of positive electrode terminal 400 and first positive electrode current collector 610 connected to each other by the swaging are preferably welded by laser welding or the like. It should be noted that first positive electrode current collector 610 is provided with a countersunk hole 610A, and swaged portion 400A is provided in countersunk hole 610A.

Further, second positive electrode current collector 620 is disposed on insulating member 630 such that a portion of second positive electrode current collector 620 overlaps with first positive electrode current collector 610. In first opening 620A provided in second positive electrode current collector 620, second positive electrode current collector 620 is welded to first positive electrode current collector 610 by laser welding or the like.

As shown in FIG. 8, insulating member 630 has a tubular portion 630A that protrudes on the electrode assembly 200 side. Tubular portion 630A extends through second opening 620B of second positive electrode current collector 620 and defines a hole portion 630B that communicates with electrolyte solution injection hole 121.

When attaching positive electrode current collecting member 600 on sealing plate 120, first positive electrode current collector 610 is first connected to insulating member 630 on sealing plate 120. Then, second positive electrode current collector 620 connected to electrode assembly 200 is attached to first positive electrode current collector 610. On this occasion, second positive electrode current collector 620 is disposed on insulating member 630 such that a portion of second positive electrode current collector 620 overlaps with first positive electrode current collector 610. Then, the circumference around first opening 620A provided in second positive electrode current collector 620 is welded to first positive electrode current collector 610 by laser welding or the like.

Next, the following describes attaching of negative electrode current collecting member 700 on sealing plate 120 with reference to FIGS. 7 and 9.

Outer side insulating member 510 composed of a resin is disposed on the outer surface side of sealing plate 120. First negative electrode current collector 710 and insulating member 730 (negative electrode current collector holder) composed of a resin are disposed on the inner surface side of sealing plate 120. Next, negative electrode terminal 500 is inserted into a through hole of outer side insulating member 510, a negative electrode terminal attachment hole of sealing plate 120, a through hole of first negative electrode current collector 710, and a through hole of insulating member 730. A swaged portion 500A located at the tip of negative electrode terminal 500 is connected onto first negative electrode current collector 710 by swaging. Thus, negative electrode terminal 500, outer side insulating member 510, sealing plate 120, first negative electrode current collector 710, and insulating member 730 are fixed. It should be noted that the portions of negative electrode terminal 500 and first negative electrode current collector 710 connected to each other by the swaging are preferably welded by laser welding or the like.

Further, second negative electrode current collector 720 is disposed on insulating member 730 such that a portion of second negative electrode current collector 720 overlaps with first negative electrode current collector 710. In first opening 720A provided in second negative electrode current collector 720, second negative electrode current collector 720 is welded to first negative electrode current collector 710 by laser welding or the like.

When attaching negative electrode current collecting member 700 on sealing plate 120, first negative electrode current collector 710 is first connected to insulating member 730 on sealing plate 120. Then, second negative electrode current collector 720 connected to electrode assembly 200 is attached to first negative electrode current collector 710. On this occasion, second negative electrode current collector 720 is disposed on insulating member 730 such that a portion of second negative electrode current collector 720 overlaps with first negative electrode current collector 710. Then, the circumference around first opening 720A provided in second negative electrode current collector 720 is welded to first negative electrode current collector 710 by laser welding or the like.

Figure 10:
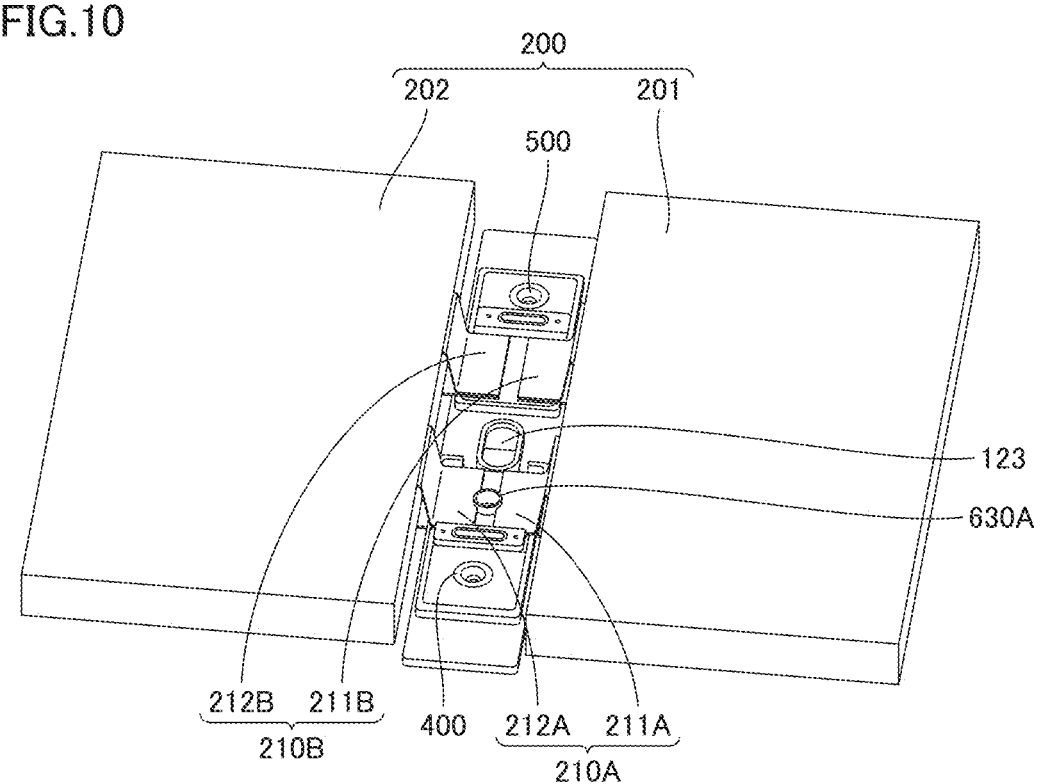
FIG. 10 is a diagram showing a state in which the sealing plate and the electrode assembly are connected to each other.

FIG. 10 is a diagram showing a state in which sealing plate 120 and electrode assembly 200 are connected to each other. As described above, first electrode assembly element 201 and second electrode assembly element 202 are attached to sealing plate 120 with positive electrode current collecting member 600 and negative electrode current collecting member 700 being interposed therebetween. Thus, as shown in FIG. 10, first electrode assembly element 201 and second electrode assembly element 202 are connected to sealing plate 120, thereby electrically connecting electrode assembly 200 to positive electrode terminal 400 and negative electrode terminal 500.

From the state shown in FIG. 10, first electrode assembly element 201 and second electrode assembly element 202 are stacked on each other. On this occasion, first positive electrode tab group 211A and second positive electrode tab group 212A are curved in different directions. First negative electrode tab group 211B and second negative electrode tab group 212B are curved in different directions.

First electrode assembly element 201 and second electrode assembly element 202 can be stacked on each other by a tape or the like. Alternatively, first electrode assembly element 201 and second electrode assembly element 202 can be stacked on each other by placing them in an insulating sheet formed in the form of a box or a pouch. Further, first electrode assembly element 201 and second electrode assembly element 202 can be fixed by adhesion.

First electrode assembly element 201 and second electrode assembly element 202 stacked on each other are enclosed with insulating sheet 300 and are inserted into prismatic exterior body 110. Thereafter, sealing plate 120 is welded to prismatic exterior body 110 to seal the opening of prismatic exterior body 110 by sealing plate 120, thereby forming sealed battery case 100.

Thereafter, a non-aqueous electrolyte is injected into battery case 100 through electrolyte solution injection hole 121 provided in sealing plate 120. Examples of the non-aqueous electrolyte solution usable herein include a non-aqueous electrolyte solution in which $LiPF_6$ is dissolved at a concentration of 1.2 mol/L in a non-aqueous solvent in which ethylene carbonate (EC), ethyl methyl carbonate (EMC), and diethyl carbonate (DEC) are mixed at a volume ratio (25° C.) of 30:30:40.

After injecting the non-aqueous electrolyte, electrolyte solution injection hole 121 is sealed by sealing member 122. By performing the above steps, prismatic secondary battery 1 is completed.

Figure 11:
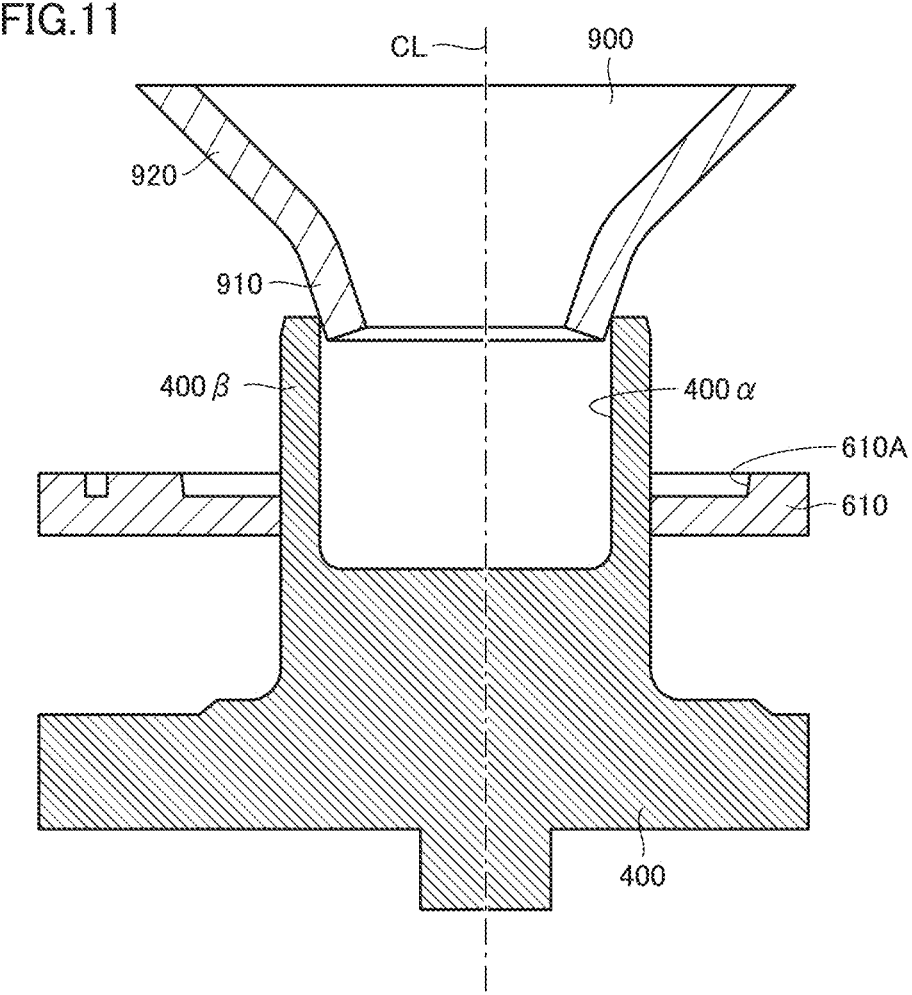
FIG. 11 is a diagram showing a first step of joining by swaging according to one embodiment.
Figure 12:
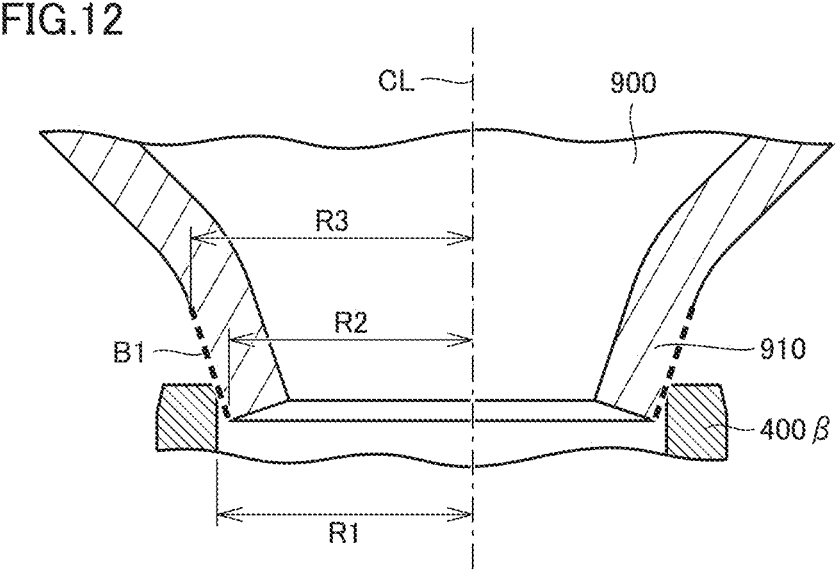
FIG. 12 is a partial enlarged view of a die tip portion in FIG. 11.

FIG. 11 is a diagram showing a first step for forming swaged portion 400A according to the present embodiment, and FIG. 12 is a partial enlarged view of a die tip portion in FIG. 11.

Swaged portion 400A has a long axis along the X axis direction and a short axis along the Y axis direction. In FIGS. 11 and 12 (the same applies to FIGS. 13 to 22 described later), the left side with respect to the central line shows a cross section in the long axis direction (X axis direction), and the right side with respect to the central line shows a cross section in the short axis direction (Y axis direction).

Swaged portion 400A according to the present embodiment has a planar shape in which a pair of straight portions extending in the X axis direction and a pair of curved portions are alternately arranged along the circumferential direction. However, the planar shape of swaged portion 400A may be an elliptical shape, or may be a perfect circular shape having no long axis and no short axis.

As shown in FIGS. 11 and 12, a molding die 900 includes: a first tapered portion 910 inclined obliquely with respect to central axis CL; and a second tapered portion 920 provided on the large-diameter side of first tapered portion 910 and inclined obliquely with respect to central axis CL at an angle larger than that of first tapered portion 910.

Positive electrode terminal 400 (terminal member) includes a tubular tip portion 400β having an inner circumferential surface 400α. Molding die 900 is used to join first positive electrode current collector 610 (first member) and tubular tip portion 400β of positive electrode terminal 400 (second member) by swaging by inserting molding die 900 into tubular tip portion 400β of positive electrode terminal 400.

Molding die 900 is disposed to cause first tapered portion 910 to face tubular tip portion 400β of positive electrode terminal 400. Then, first tapered portion 910 located on the tip side of molding die 900 is inserted into tubular tip portion 400β of positive electrode terminal 400 along central axis CL.

Here, the minimum diameter (2×R2) of first tapered portion 910 is smaller than the hole diameter (2×R1) of tubular tip portion 400β by more than or equal to 100 μm. Thus, even when molding die 900 is slightly misaligned, the tip of first tapered portion 910 can be inserted into tubular tip portion 400β of positive electrode terminal 400 without any trouble.

Figure 13:
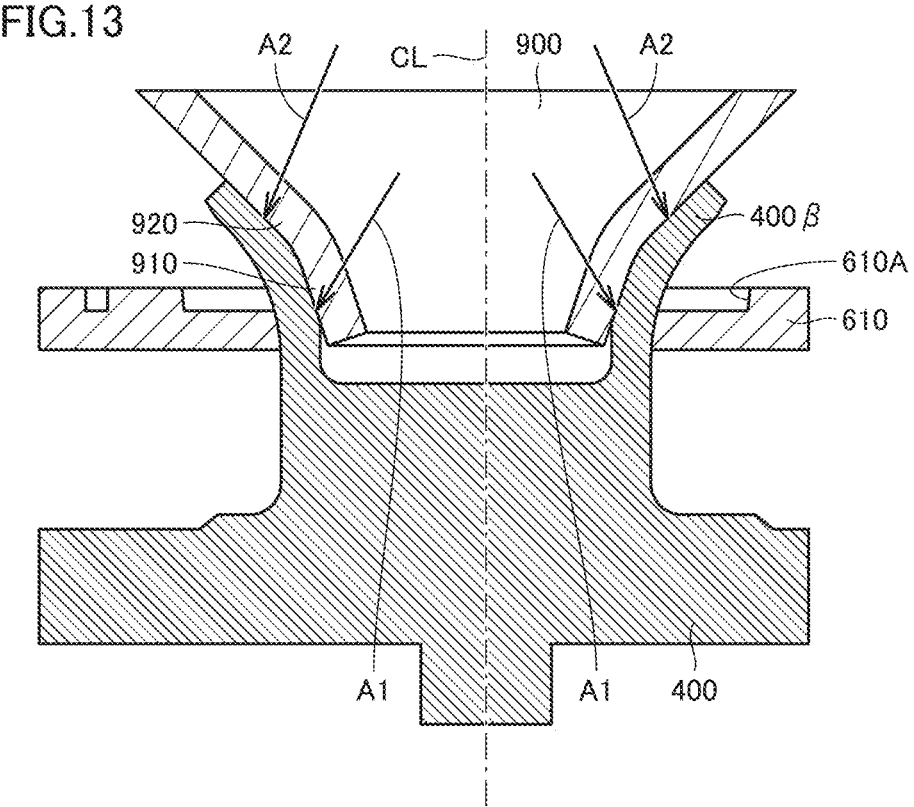
FIG. 13 is a diagram showing a second step of the joining by swaging according to one embodiment.
Figure 14:
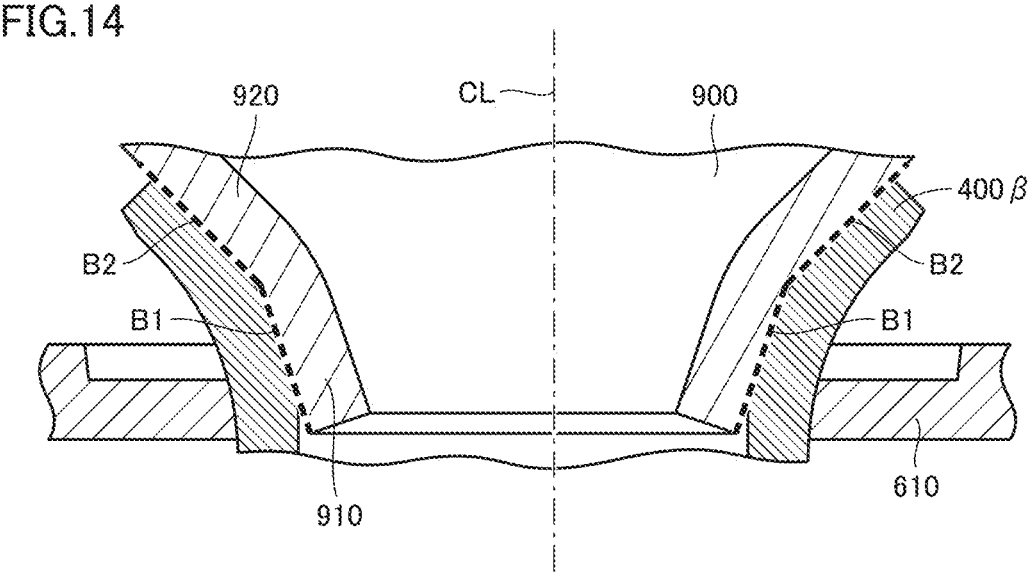
FIG. 14 is a partial enlarged view of the die tip portion in FIG. 13.

FIG. 13 is a diagram showing a second step subsequent to the step in FIGS. 11 and 12, and FIG. 14 is a partial enlarged view of the die tip portion in FIG. 13.

As shown in FIGS. 13 and 14, molding die 900 inserted in tubular tip portion 400β of positive electrode terminal 400 is further inserted toward the inner side of tubular tip portion 400β.

On this occasion, first tapered portion 910 located on the tip side of molding die 900 is brought into abutment with tubular tip portion 400β at an abutment surface B1 (first portion), and presses tubular tip portion 400β outward in the radial direction along a direction of arrow A1.

Second tapered portion 920 located on the root side of molding die 900 is brought into abutment with tubular tip portion 400β at an abutment surface B2 (second portion), and presses tubular tip portion 400β outward in the radial direction along a direction of arrow A2. Thus, the diameter of tubular tip portion 400β of positive electrode terminal 400 is increased.

Since the whole of tubular tip portion 400β can be deformed by pressing the different portions (abutment surfaces B1, B2) of tubular tip portion 400β along the different directions (arrows A1 and A2) in this way, stress of tubular tip portion 400β can be suppressed from being locally excessive in the swaging step to cause fracture.

Further, since first tapered portion 910 presses the root portion of tubular tip portion 400β to increase the diameter of tubular tip portion 400β from the root portion, swaged portion 400A is likely to be spread and is therefore likely to reach the sidewall of countersunk hole 610A.

Further, even when molding die 900 is misaligned with respect to positive electrode terminal 400, tubular tip portion 400β can be deformed while suppressing variation in shape by first tapered portion 910 having a comparatively small inclination angle with respect to central axis CL.

By using molding die 900 according to the present embodiment in this way, tubular tip portion 400β can be suppressed from being fractured and the shape of swaged portion 400A to be formed can be stable.

Here, the maximum diameter (2×R3: see FIG. 12) of first tapered portion 910 is larger than the hole diameter (2×R1: see FIG. 12) of tubular tip portion 400β. More preferably, the maximum diameter (2×R3) of first tapered portion 910 is larger than the hole diameter (2×R1) of tubular tip portion 400β by more than or equal to about 50 μm (more preferably, more than or equal to about 100 μm).

This relation (R3>R1) may be established in at least one cross section extending through central axis CL; however, the relation (R3>R1) is more preferably established in a cross section (for example, a cross section in the long axis direction) including a portion at which the tip of positive electrode terminal 400 is welded to first positive electrode current collector 610, and the relation (R3>R1) is further preferably established in all the cross sections including central axis CL (all cross sections in the entire circumference around central axis CL).

With the above relation (R3>R1) being satisfied, pressing forces in the different directions (arrows A1 and A2) can be securely exerted from first tapered portion 910 and second tapered portion 920 of molding die 900 to tubular tip portion 400β of positive electrode terminal 400. As a result, the shape of swaged portion 400A can become readily stable.

Figure 15:
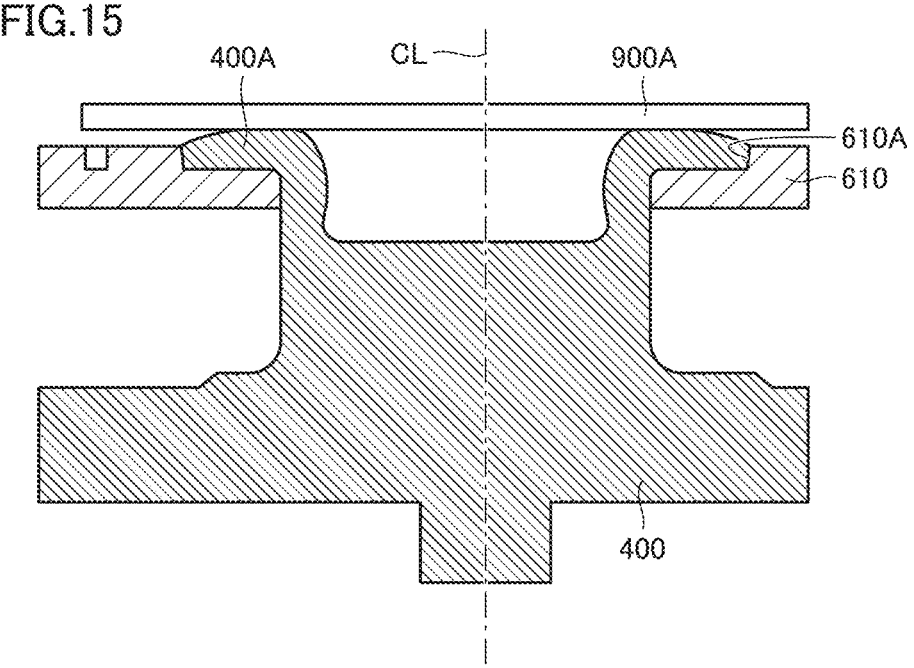
FIG. 15 is a diagram showing a third step of the joining by swaging according to one embodiment.
Figure 16:
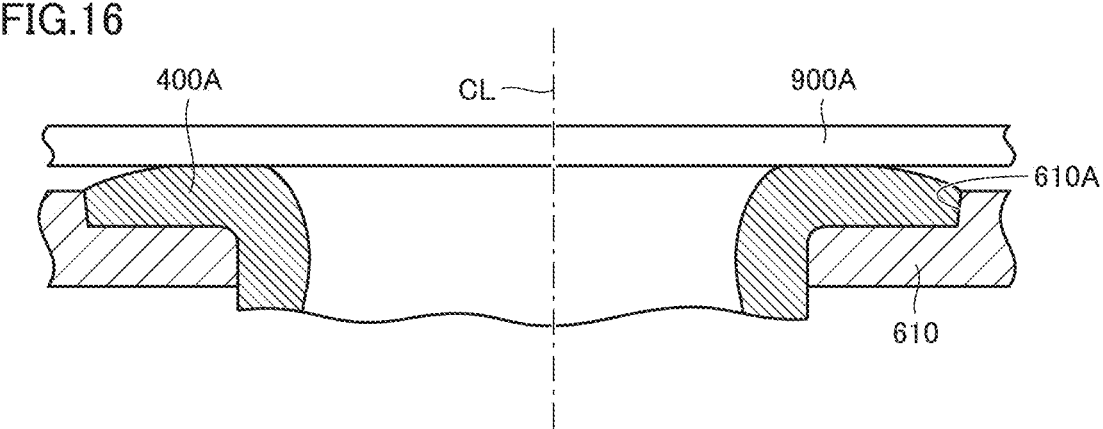
FIG. 16 is a partial enlarged view of a swaging-joined portion in FIG. 15.

FIG. 15 is a diagram showing a third step subsequent to the step in FIGS. 13 and 14, and FIG. 16 is a partial enlarged view of the swaging-joined portion in FIG. 15.

As shown in FIGS. 15 and 16, swaged portion 400A is further pressed by a second die 900A. As a result, the tip of tubular tip portion 400β reaches the sidewall of countersunk hole 610A. The tip of positive electrode terminal 400 is welded to first positive electrode current collector 610. Since the tip of positive electrode terminal 400 securely reaches the sidewall of countersunk hole 610A, welding is readily performed and the strength of the welding is also stable.

Figure 17:
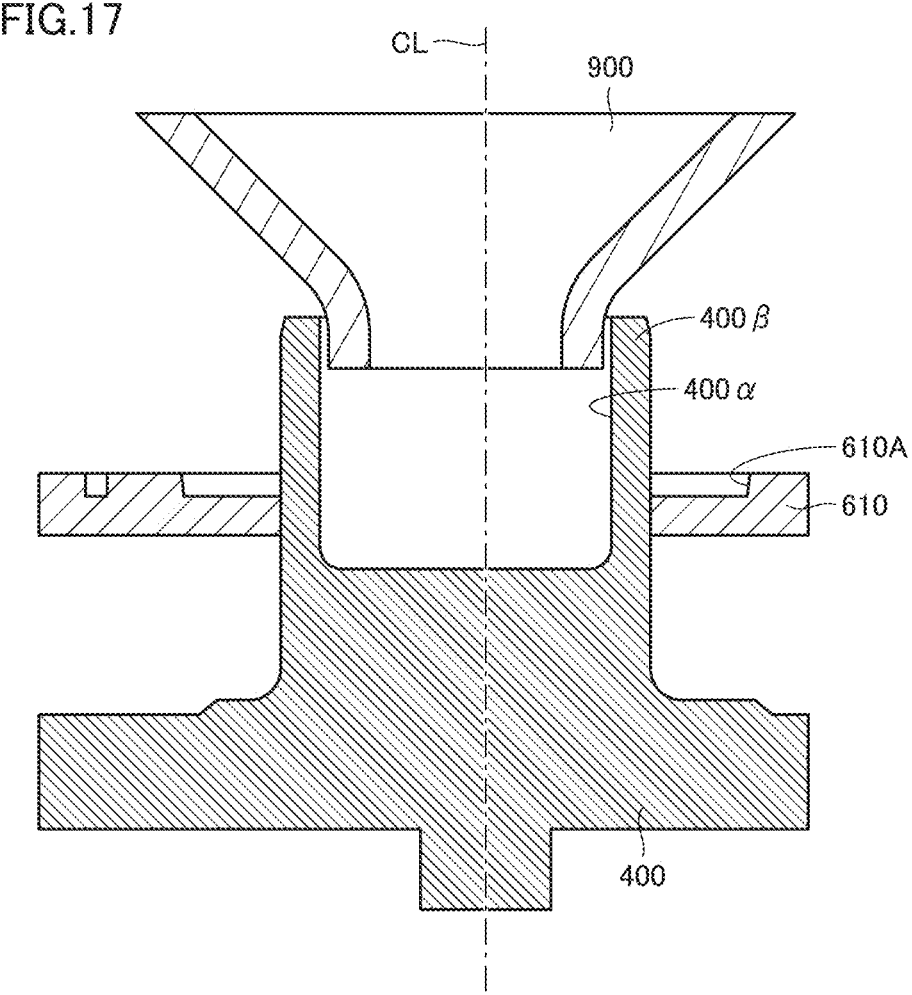
FIG. 17 is a diagram showing a first step of joining by swaging according to a comparative example.
Figure 18:
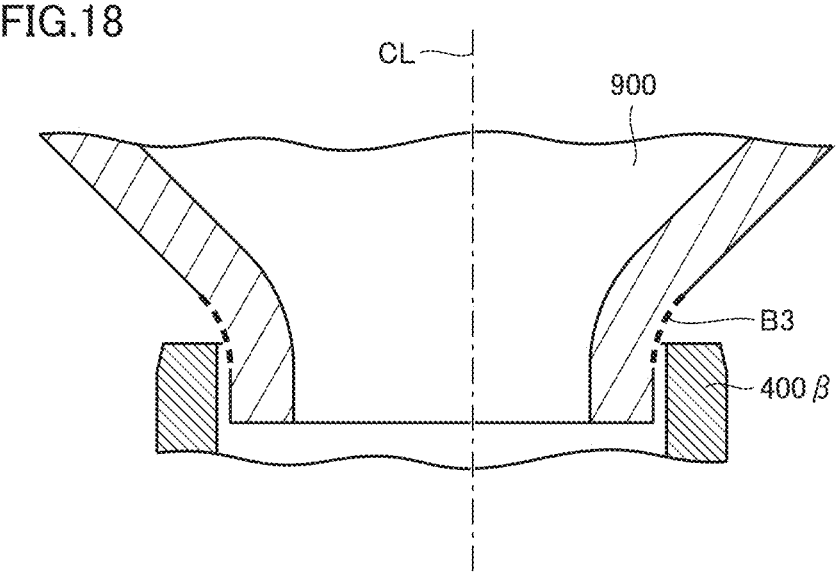
FIG. 18 is a partial enlarged view of a die tip portion in FIG. 17.
Figure 19:
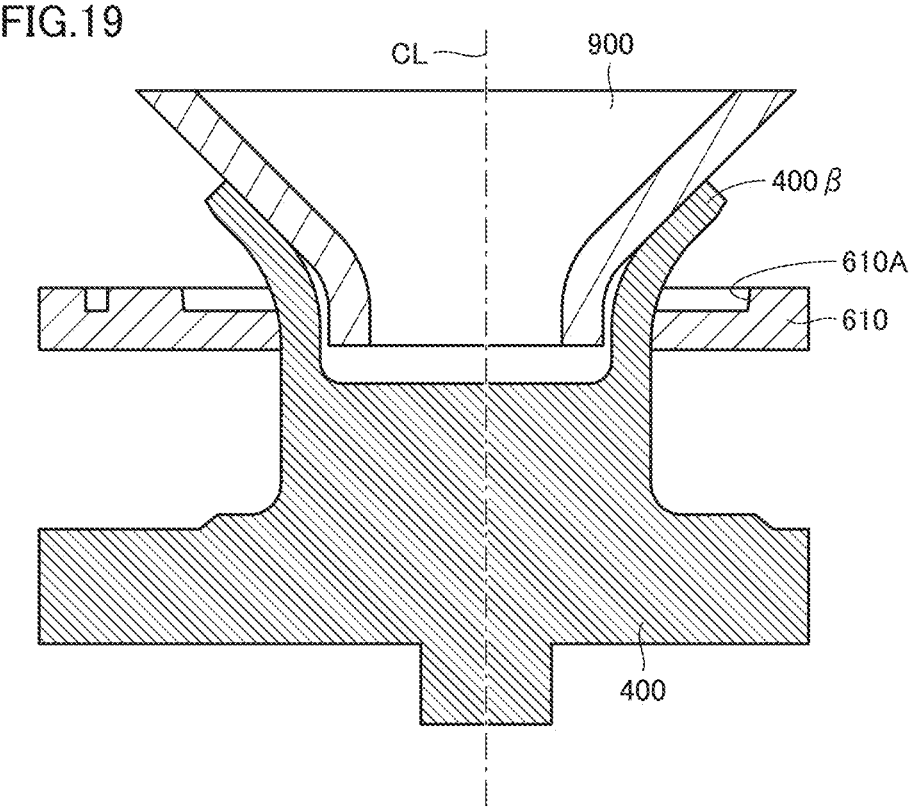
FIG. 19 is a diagram showing a second step of the joining by swaging according to the comparative example.
Figure 20:
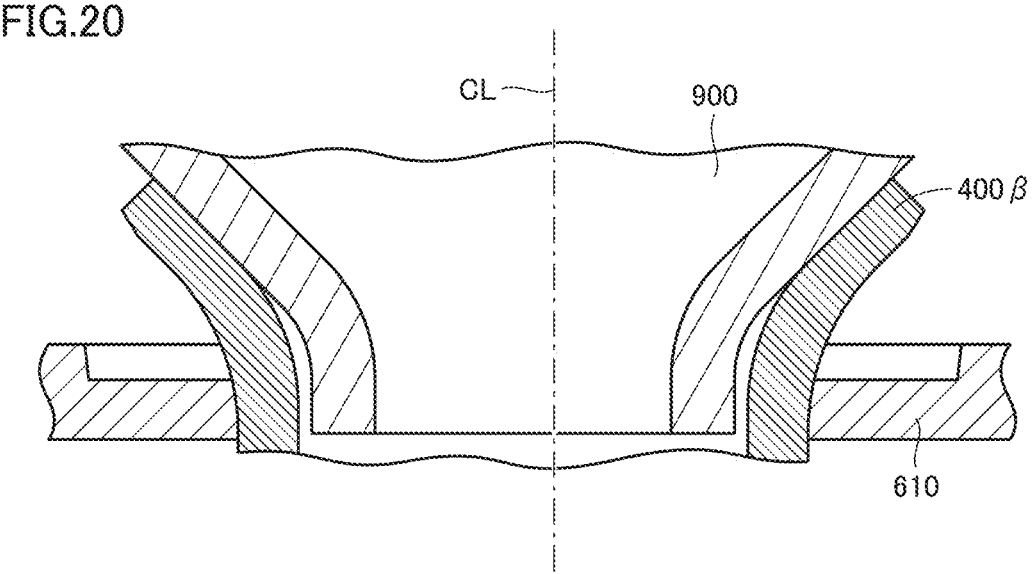
FIG. 20 is a partial enlarged view of a die tip portion in FIG. 19.
Figure 21:
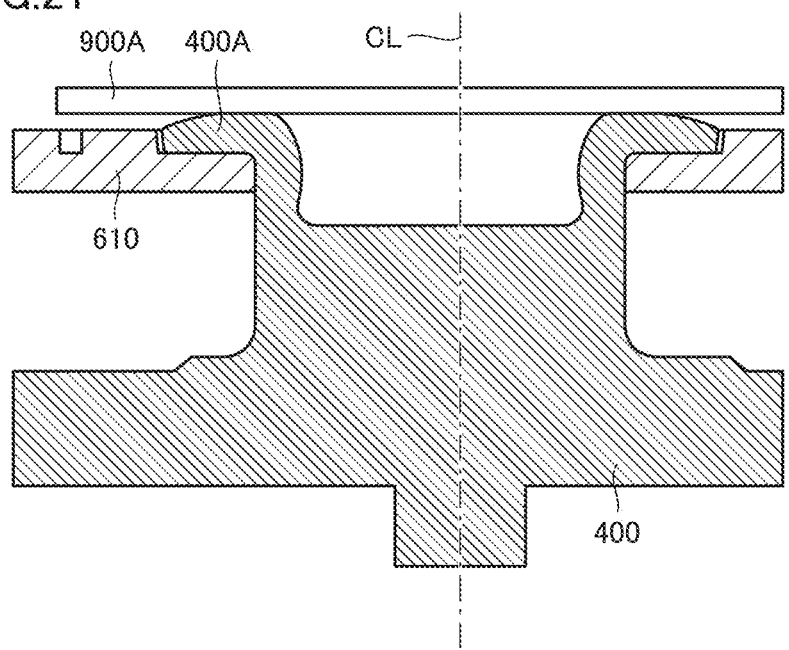
FIG. 21 is a diagram showing a third step of the joining by swaging according to the comparative example.

FIG. 17 is a diagram showing a first step for forming swaged portion 400A according to a comparative example, and FIG. 18 is a partial enlarged view of the die tip portion in FIG. 17. FIG. 19 is a diagram showing a second step subsequent to the step in FIGS. 17 and 18, and FIG. 20 is a partial enlarged view of the die tip portion in FIG. 19. FIG. 21 is a diagram showing a third step subsequent to the step in FIGS. 19 and 20, and FIG. 22 is a partial enlarged view of the swaging-joined portion in FIG. 21.

Also in the comparative example shown in FIGS. 17 to 22, swaged portion 400A is formed through the same steps as those in the example shown in FIGS. 11 to 16. However, in the comparative example of FIGS. 17 to 22, the shape of molding die 900 is different from that in the structure according to the present embodiment.

Figure 22:
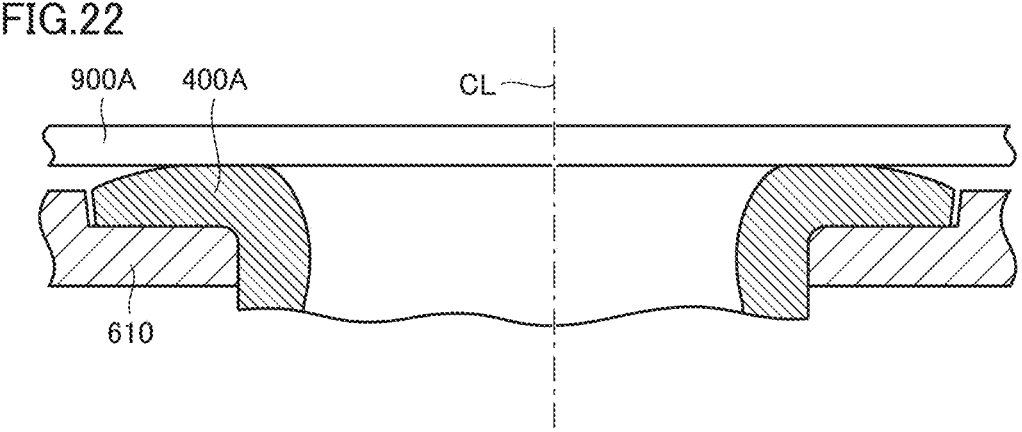
FIG. 22 is a partial enlarged view of a swaging-joined portion in FIG. 21.

That is, in the comparative example of FIGS. 17 to 22, a curved surface B3 of molding die 900 located on the tip side is not brought into abutment with tubular tip portion 400β of positive electrode terminal 400, with the result that pressing force is concentrated on the tip of tubular tip portion 400β. As a result, tubular tip portion 400β may be fractured. Further, since the root portion of tubular tip portion 400β is not directly pressed and is therefore less likely to be deformed, with the result that swaged portion 400A is less likely to be spread. As a result, as shown in FIGS. 21 and 22, swaged portion 400A may not reach the sidewall of countersunk hole 610A.

Figure 23:
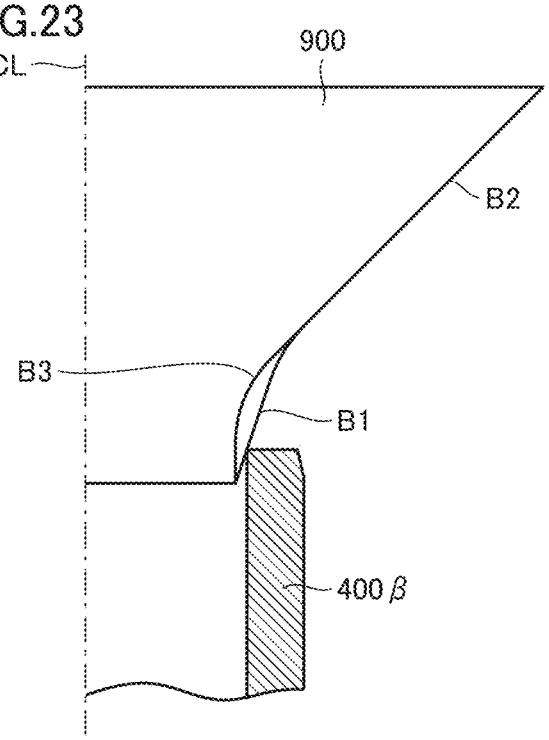
FIG. 23 is a schematic diagram showing the joining by swaging according to one embodiment and the joining by swaging according to the comparative example in comparison.
Figure 24:
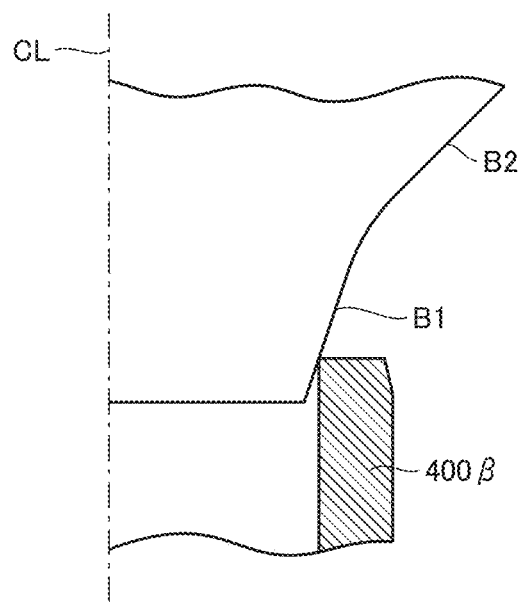
FIG. 24 is a diagram showing the joining by swaging according to one embodiment as extracted from FIG. 23.
Figure 25:
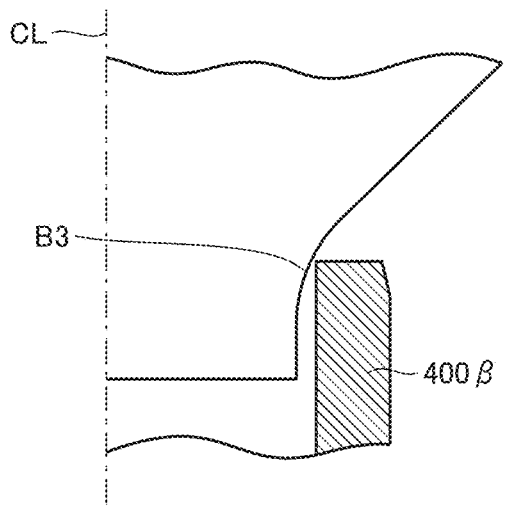
FIG. 25 is a diagram showing the joining by swaging according to the comparative example as extracted from FIG. 23.

FIG. 23 is a schematic diagram showing the joining by swaging according to the present embodiment and the joining by swaging according to the comparative example in comparison. FIGS. 24 and 25 are diagrams respectively showing the swaging-joined portions according to the present embodiment and the comparative example as extracted from FIG. 23. Referring to FIGS. 23 to 25, it is readily understandable that in the present embodiment, when inserting molding die 900 into tubular tip portion 400β, first tapered portion 910 is brought into abutment with tubular tip portion 400β, whereas in the comparative example, curved surface B3 is not brought into abutment with tubular tip portion 400β.

Figure 26:
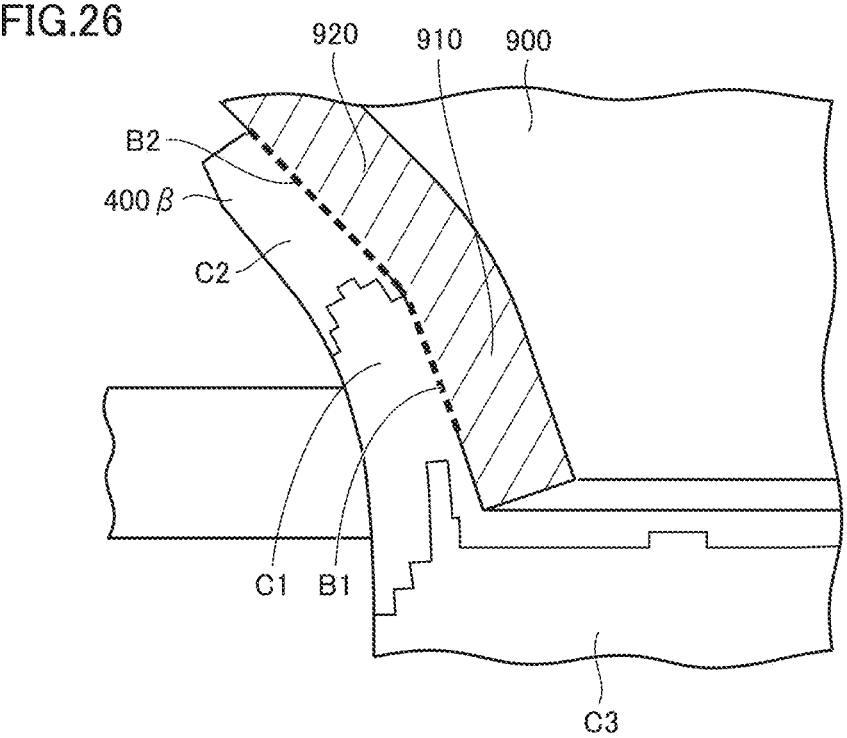
FIG. 26 is a diagram illustrating a stress distribution during the joining by swaging.

FIG. 26 is a diagram illustrating a stress distribution during the formation of swaged portion 400A. Referring to FIG. 26, in a region C2 located at the extreme tip of tubular tip portion 400β, stress of tubular tip portion 400β is the maximum. Stress in a region C1 located on the root side of region C2 is smaller than the stress in region C2. Stress in a region C3 located at the bottom portion of tubular tip portion 400β is further smaller than the stress in region C1.

Thus, the stress generated in the swaging step is increased in the direction toward the tip of tubular tip portion 400β. According to molding die 900 of the present embodiment, the root portion of tubular tip portion 400β can be pressed by first tapered portion 910, with the result that the stress generated in the extreme tip portion (region C2) of tubular tip portion 400β can be relieved to suppress fracture of tubular tip portion 400β.

Figure 27:
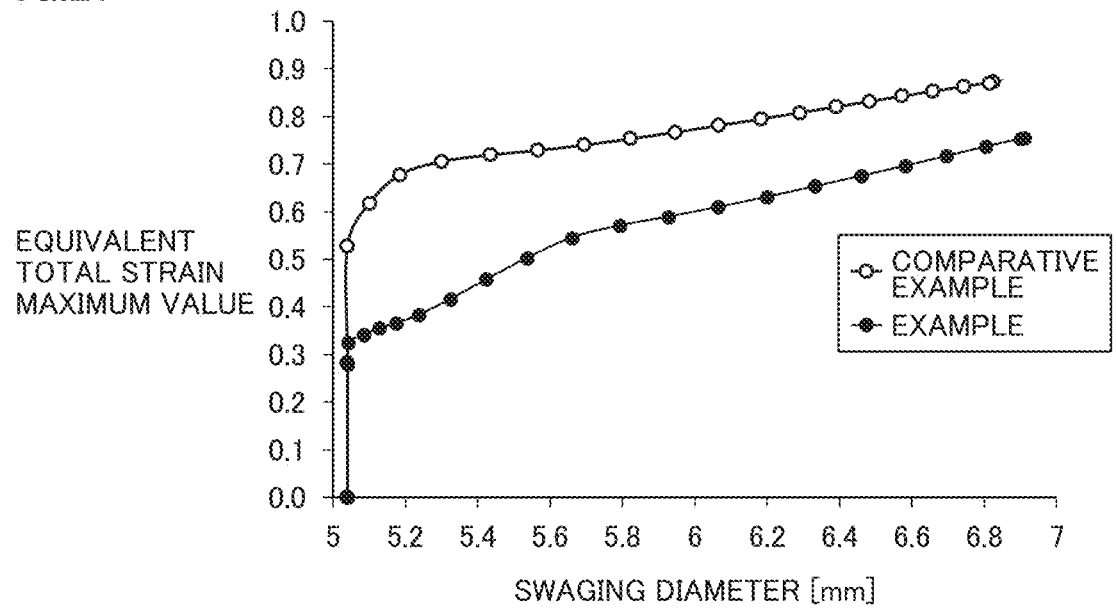
FIG. 27 is a diagram showing a relation between a swaging diameter and an equivalent total strain maximum value.

FIG. 27 is a diagram showing a relation between a swaging diameter and an equivalent total strain maximum value. Here, the term "swaging diameter" refers to the opening diameter of the tip of tubular tip portion 400β to be increased by molding die 900. Therefore, the swaging diameter is increased as the swaging step is progressed.

As shown in FIG. 27, in the case where molding die 900 according to the present embodiment is used (example of the present technology), an increase in the equivalent total strain maximum value is suppressed as a whole as compared with that in the comparative example. As a result, tubular tip portion 400β can be suppressed from being fractured and the shape of swaged portion 400A to be formed can be stable.

Next, the shape of swaged portion 400A during and after the joining by swaging according to the present embodiment will be described with reference to FIGS. 28 and 29, and the shape of swaged portion 400A during and after the joining by swaging according to the comparative example will be also described with reference to FIGS. 30 and 31.

Figure 28:
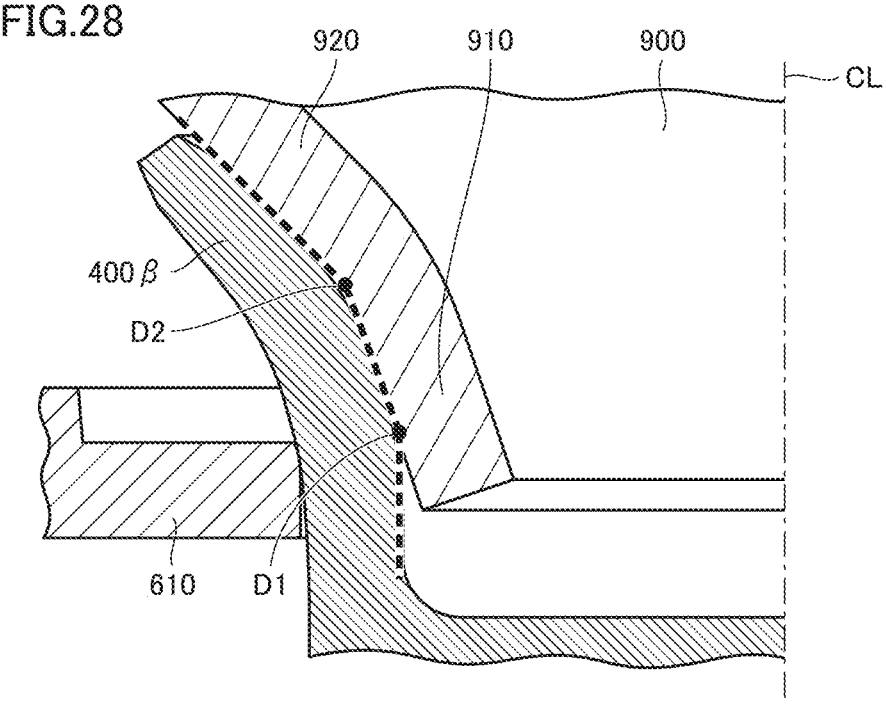
FIG. 28 is a diagram for illustrating a shape of a swaged portion during the joining by swaging according to one embodiment.

In prismatic secondary battery 1 according to the present embodiment, since tubular tip portion 400β of positive electrode terminal 400 is pressed by first tapered portion 910 and second tapered portion 920 as shown in FIG. 28, two folded portions D1, D2 are formed during the swaging step to discontinuously change the inclination of inner circumferential surface 400α. As shown in FIG. 29, folded portion D1 on the root side remains even after further pressing by second die 900A.

Figure 29:
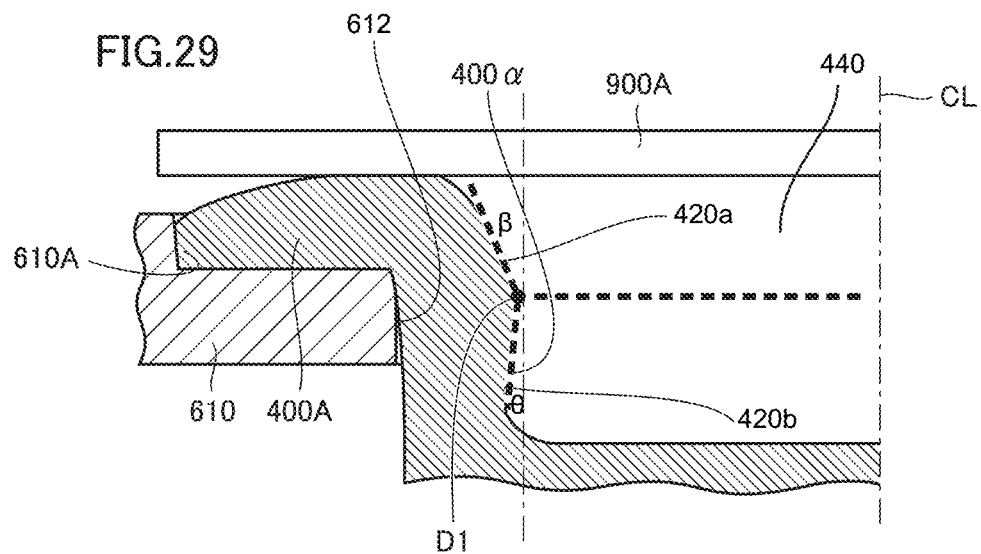
FIG. 29 is a diagram for illustrating a shape of the swaged portion after the joining by swaging according to one embodiment.

In the prismatic secondary battery 1 as shown in FIG. 29, a conductive member, e.g., the first positive electrode current collector 610, is provided with a through hole, e.g., the countersunk hole 610A. The conductive member 610 is further provided with a hole portion 612. Further, a swaging-joined portion (e.g., swaged portion 400A) of the tip portion of the terminal member 401 to the conductive member is formed in the hole portion 612. The tip portion of the terminal member 401 is provided with a recess 440 having an inner circumferential surface 400α. The folded portion D1 is formed on the inner circumferential surface 400α, the folded portion D1 being a portion at which inclination of the inner circumferential surface 400α is changed with respect to a central axis of the terminal member 401. The inner circumferential surface 400α includes a first portion 420a adjacent to the folded portion D1 and on a first side of the folded portion D1, and a second portion 420b adjacent to the folded portion D1 and on a second side of the folded portion D1, the second side opposite the first side. The first portion 420a and the second portion 420b are both inclined in a direction away from the central axis of the terminal member 401 as the first portion 420a and the second portion 420b extend away from the folded portion D1. The first portion 420a is inclined away from a direction perpendicular to the central axis of the terminal member 401 by a first angle β, and the second portion 420b is inclined away from the direction perpendicular to the central axis of the terminal member 401 by a second angle θ, the second angle θ being different from the first angle β.

Figure 30:
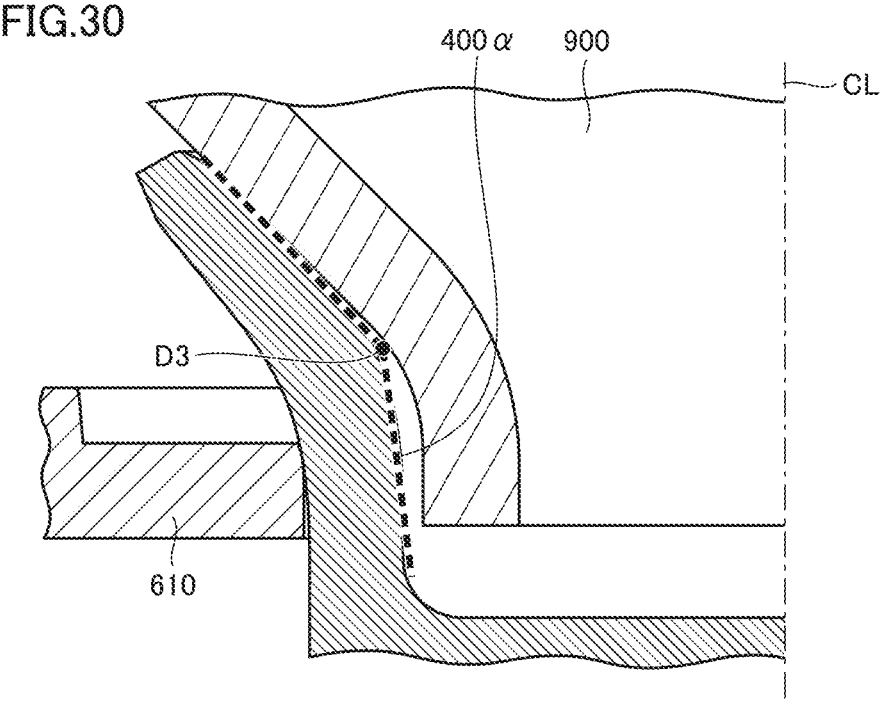
FIG. 30 is a diagram for illustrating a shape of a swaged portion during the joining by swaging according to the comparative example.
Figure 31:
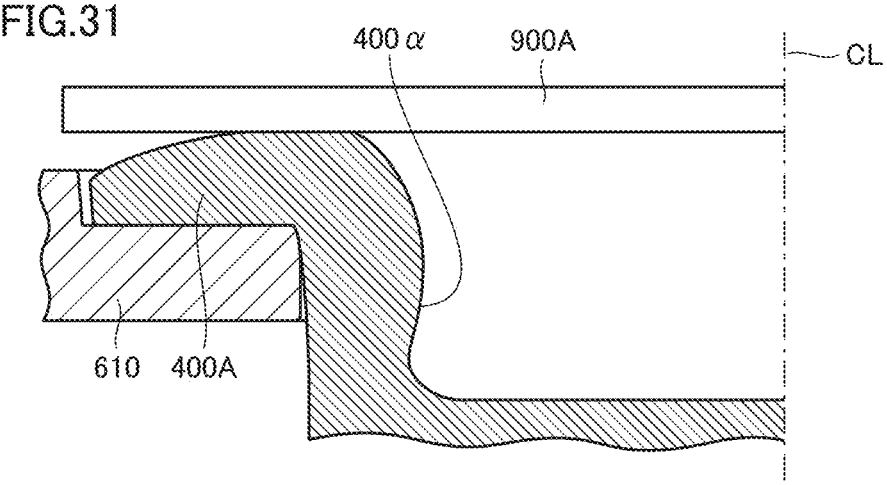
FIG. 31 is a diagram for illustrating a shape of the swaged portion after the joining by swaging according to the comparative example.

On the other hand, in the comparative example, one folded portion D3 is formed during the swaging step as shown in FIG. 30; however, as shown in FIG. 31, after further pressing by second die 900A, no bending remains to discontinuously change the inclination of inner circumferential surface 400α.

However, also in prismatic secondary battery 1 according to the present embodiment, folded portion D1 may not remain.

Folded portion D1 may be formed in an annular shape across the entire circumference of inner circumferential surface 400α, or may be formed at a portion of inner circumferential surface 400α in the circumferential direction.

Figure 32:
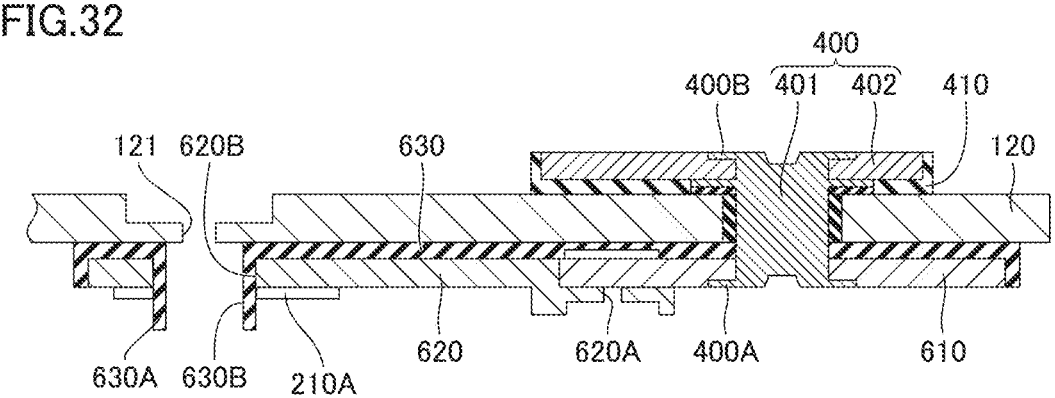
FIG. 32 is a diagram showing a structure of the swaged portion outside the battery case.

In the above-described example, swaged portion 400A inside battery case 100 has been described; however, as shown in FIG. 32, the same configuration can be employed for a swaged portion 400B of a terminal member 401 of positive electrode terminal 400 to an external terminal 402. That is, the structure of joining by swaging according to the present technology is also applicable to a structure of joining of a terminal member to a conductive member, which are disposed outside battery case 100.

Further, a third tapered portion (not shown) may be provided on the large-diameter side of second tapered portion 920, the third tapered portion being inclined with respect to central axis CL at an angle larger than that of the second tapered portion.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A battery comprising:
a conductive member provided with a through hole; and
a terminal member inserted in the through hole and having a tip portion exposed on the conductive member, wherein
a swaging-joined portion of the tip portion of the terminal member to the conductive member is formed,
the tip portion of the terminal member is provided with a recess having an inner circumferential surface,
a folded portion is formed on the inner circumferential surface, the folded portion being a portion at which inclination of the inner circumferential surface is changed with respect to a central axis of the terminal member,
the inner circumferential surface comprises:
a first portion adjacent to the folded portion and on a first side of the folded portion, and a second portion adjacent to the folded portion and on a second side of the folded portion, the second side opposite the first side, and the first portion and the second portion are both inclined in a direction away from the central axis of the terminal member as the first portion and the second portion extend away from the folded portion.

2. The battery according to claim 1, wherein the conductive member is provided with a hole portion having a sidewall, the swaging-joined portion is formed in the hole portion, at the swaging-joined portion, a tip of the terminal member reaches the sidewall of the hole portion.

3. The battery according to claim 2, wherein at at least a portion of the swaging-joined portion, the tip of the terminal member is welded to the conductive member.

4. The battery according to claim 1, further comprising an electrode assembly, wherein the conductive member is a current collector that electrically connects the electrode assembly and the terminal member to each other.

5. The battery according to claim 1, wherein the first portion is inclined away from a direction perpendicular to the central axis of the terminal member by a first angle, and the second portion is inclined away from the direction perpendicular to the central axis of the terminal member by a second angle, the second angle being different from the first angle.

6. The battery according to claim 5, wherein the first portion is closer to the swaging-joined portion than the second portion, and the second angle is smaller than the first angle.

* * * * *